United States Patent Office 3,388,113
Patented June 11, 1968

3,388,113
PROTECTION OF THE GUANIDINO GROUP OF ARGININE DURING PEPTIDE SYNTHESIS BY THE p-NITROCARBOBENZOXY GROUP
Stephan Guttmann, Alischwil, Roger Boissonnas, Bottmingen, and Janos Pless, Basel, Switzerland, assignors to Sandoz Ltd. (also known as Sandoz A.G.), Basel, Switzerland
No Drawing. Filed Aug. 27, 1964, Ser. No. 392,624
Claims priority, application Switzerland, Aug. 30, 1963, 10,776/63
2 Claims. (Cl. 260—112.5)

ABSTRACT OF THE DISCLOSURE

The guanidino group of arginine, arginine-containing peptides and their derivatives may be protected by reaction with p-nitrocarbobenzoxy chloride. The advantage is that the radical p-nitrobenzyloxycarbonyl on the guanidino group is stable under the conditions used to remove protecting groups from the α-amino group and the carboxyl group during the synthesis of peptides and may be removed at the end of all the condensations by hydrogenolysis. Examples of the synthesis of the peptides are given such as L-phenylalanyl-L-arginyl-L-proline and L-arginyl-L-arginyl-L-proline.

The present invention relates to arginine containing peptides and to a process for the production thereof.

The basic amino acid arginine is a constituent of various natural occurring, biologically active peptides. During the synthesis of polypeptides which contain arginine—whether they be naturally occurring or synthetically produced—the guanidino radical of the arginine radical must be protected in order to avoid undesired side reactions. The nitro radical, the p-toluenesulfonyl and the carbobenzoxy radical have hitherto been used as protective radicals for the guanidino radical. These three radicals, however, have various disadvantages: Thus, for example, the nitro radical is only capable of being split off by catalytic hydrogenation, a hydrogenation which is especially tedious and often incomplete in the case of higher peptides. The p-toluenesulfonyl radical is only capable of being split off by treatment with sodium in liquid ammonia. This method, however, cannot be used in the case of methionine containing polypeptides and also leads to cleavages in the peptide chain in the case of many other polypeptides, whereby the yield of the desired final product is considerably reduced. It is furthermore not possible to use the carbobenzoxy radical for the protection of both the guanidino radical and the α-amino radical of the arginine radical or of the arginine containing polypeptide since, hitherto, no method is known for the selective splitting off of the carbobenzoxy radical from the α-amino radical without simultaneously splitting it off from the guanidino radical of the arginine radical. Upon catalytic hydrogenation or by treatment with hydrobromic acid in glacial acetic acid the carbobenzoxy radical is split off from the guanidino as well as from the α-amino radical.

It has now surprisingly been found that the p-nitrocarbobenzoxy radical is not split off from the guanidino radical of arginine by the reaction of an anhydrous solution of hydrobromic acid in glacial acetic acid at room temperature, although the same radical is capable of being easily split off from the α-amino radical of arginine or of the arginine containing polypeptide under the same conditions. This particular acid hydrolysis, which is comparatively mild and is the method now almost exclusively used for the building up of biologically highly active polypeptides, can thus be employed.

By the use of the p-nitrocarbobenzoxy radical the guanidino radical also remains protected when the carbotert-butoxy radical or the p-methoxycarbobenzoxy radical, which may also be used for the protection of the α-amino radical, or the tert-butyl radical for the protection of the carboxyl radical, is split off by the action of trifluoroacetic acid, as well as when the triphenylmethyl radical is split off from the α-amino radical with aqueous acetic acid and when an ester radical is saponified by the action of an aqueous alkali. The present invention is also particularly surprising because it has been established that $N^\alpha$-p-nitrobenzyloxycarbonyl-L-arginine is not suitable for the building up of polypeptides.

The protective radical of the invention is also stable towards all condensation methods hitherto known for the building up of polypeptides, e.g., the azide method, the method of the mixed anhydrides, the method of the activated esters, the dicyclohexylcarbodiimide method and the diimidazolecarbonyl method. This great stability of the bond between the guanidino and the p-nitrocarbobenzoxy radical thus makes it possible to synthesize arginine containing polypeptides in a relatively easy manner and with a hitherto unknown good yield.

The protective radical of the invention may be introduced by means of all the sufficiently reactive functional derivatives of p-nitrophenyl-carboxylic acid ester, the most suitable being p-nitrocarbobenzoxy chloride. For example, arginine or a polypeptide containing arginine as the last member of the chain and the α-amino radical of which is protected by one of the above mentioned protective radicals, is acylated with p-nitrocarbobenzoxy chloride in an aqueous alkali solution. After the polypeptide has been completely built up, the p-nitrocarbobenzoxy radical may be split off before, simultaneously or after the other protective radicals of the peptide by catalytic hydrogenation, preferably on a palladium catalyst, in organic or aqueous solution.

The following examples describe the process of the invention.

EXAMPLE 1.—Nα-CARBOBENZOXY-N(GUANIDINO)-p-NITROCARBOBENZOXY-L-ARGININE 90 g. of Nα-carbobenzoxy-L-arginine are dissolved in a mixture of 350 cc. of 1 N sodium hydroxide and 350 cc. of dioxane, a solution of 97 g. of p-nitrobenzyloxycarbonyl chloride in 100 cc. of dioxane is slowly added and adjustment to a pH value of 12 is effected by the addition of 4 N sodium hydroxide. After one hour 2000 cc. of water are added, filtration is effected, the filtrate is extracted with ethyl ether and the aqueous phase is adjusted to a pH value of 2. The precipitated oil is dissolved in 300 cc. of methanol which contains 12 g. of sodium hydroxide, kept for one hour at 20° and concentrated to half its volume. 600 cc. of water are added, acidification is effected with dilute sulfuric acid and the preciptated oil is crystallized from a mixture of ethyl acetate/dioxane (8:2). 91 g. of Nα-carbobenzoxy-N(guanidino)-p-nitrocarbobenzoxy-L-arginine are obtained. Melting point 127°. $[\alpha]_D^{22} = -4°$ in dimethylformamide.

EXAMPLE 2.—N(GUANIDINO)-p-NITROCARBOBENZOXY-L-ARGININE DIHYDROBROMIDE 5 g. of Nα-carbobenzoxy-N(guanidino)-p-nitrocarbobenzoxy-L-arginine are dissolved in 50 cc. of a 4 N solution of hydrogen bromide in glacial acetic acid, the solution is left to stand for one hour at 20°, the resulting hydrobromide is precipitated with ether, filtration is effected and washing is effected with ethyl ether. After drying, 5.2 g. of N(guanidino)-p-nitrocarbobenzoxy-L-arginine dihydrobromide are obtained. Melting point 130° (decomposition). $[\alpha]_D^{22} = +8°$ in methanol.

EXAMPLE 3.—Nα-CARBOBENZOXY - N(GUANIDINO) - p - NITROCARBOBENZOXY-L-ARGINYL-L-PROLINE METHYL ESTER 19.8 g. of Nα - carbobenzoxy-N(guanidino)p-nitrocarbobenzoxy-L-arginine and 6.0 g. of L-proline methyl ester are dissolved in 100 cc. of acetonitrile and 100 cc. of methylene chloride, cooling is effected to −10°, 8.3 g. of dicyclohexylcarbodiimide are added and shaking is effected for 50 hours at 20° C. After filtration, evaporation is effected, the residue is dissolved in ethyl acetate, washing is effected with dilute acid and aqueous sodium bicarbonate solution, the organic solution is dried and evaporated. The residue is dissolved in ethyl acetate and precipitation is effeced with ethyl ether. 12 g. of dipeptide ester are obtained. Melting point 90° (decomposition). $[\alpha]_D^{22} = -25°$ in dimethylformamide.

EXAMPLE 4.—Nα - CARBOBENZOXY - N(GUANIDINO) - p - NITROCARBOBENZOXY-L-ARGINYL-L-PROLINE 19.8 g. of Nα-carbobenzoxy-N(guanidino)-p-nitrocarbobenzoxy-L-arginine and 7.8 g. of L-proline-tert-butyl ester are dissolved in 100 cc. of acetonitrile and 100 cc. of methylene chloride, cooling is effected to −10°, 8.3 g. of dicyclohexylcarbodiimide are added, shaking is effected for 50 hours at 20°, filtration and evaporation are effected, the residue is disolved in ethyl acetate, washing is effected with dilute sulfuric acid and aqueous sodium bicarbonate solution, drying is effected over sodium sulfate, evaporation is effected, the residue is dissolved in ethyl acetate, precipitation with ethyl ether and filtration are effected. The resulting dipeptide ester is dissolved in 100 cc. of trifluoroacetic acid, the solution is left to stand for one hour at 20°, evaporation is effected, ethyl ether is added to the residue, filtration is effected, the residue is dissolved in 100 cc. of 1 N ammonium hydroxide, washing is effected with ethyl acetate, the aqueous solution is acidified, the oily precipitate is extracted with chloroform, drying and evaporation are effected. The residue is dissolved in chloroform and precipitation is effected with ethyl ether. After filtering and drying, 14.3 g. of Nα-carbobenzoxy-N(guanidino)-p-nitrocarbobenzoxy-L-arginyl-L-proline are obtained. Melting point 115° (decomposition). $[\alpha]_D^{22} = -29°$ in 95% acetic acid.

EXAMPLE 5.—N(GUANIDINO) - p-NITROCARBOBENZOXY - L - ARGINYL-L-PROLINE METHYL ESTER DIHYDROBROMIDE 81 g. of Nα-carbobenzoxy-N(guanidino)-p-nitrocarbobenzoxy-L-arginyl-L-proline methyl ester are dissolved in 500 cc. of a 4 N solution of hydrogen bromide in glacial acetic acid, the solution is left to stand for one hour at 20°, precipitation is effected with ethyl ether, filtration is effected, the residue is dissolved in 200 cc. of methanol and crystallization is effected by the addition of ethyl ether. After filtering, washing and drying, 76 g. of dipeptide ester dihydrobromide are obtained. Melting point 120° (decomposition). $[\alpha]_D^{22} = -33°$ in 95% acetic acid.

EXAMPLE 6.—Nα - CARBOBENZOXY - L - PHENYLALANYL - N(GUANIDINO) - p - NITROCARBOBENZOXY - L - ARGINYL-L-PROLINE METHYL ESTER 9.6 g. of Nα-carbobenzoxy-L-phenylalanine-2,4,5-trichlorophenyl ester and 12.5 g. of N(guandino)-L-arginyl-L-proline methyl ester dihydrobromide are dissolved in 20 cc. of dimethylformamide, 5.6 cc. of triethylamine are added and the mixture is left to stand for 16 hours at 20°. After the addition of 500 cc. of ethyl acetate, washing is effected with dilute sulfuric acid and aqueous sodium bicarbonate solution, concentration is effected and precipitation is effected with ethyl ether. 13.6 g. of tripeptide ester are obtained. Melting point 130° (decomposition). $[\alpha]_D^{22} = -36°$ in dimethylformamide.

EXAMPLE 7.—Nα - CARBOBENZOXY - N(GUANIDINO) - p - NITROCARBOBENZOXY - L - ARGINYL - N(GUANIDINO) - p - NITROCARBOBENZOXY - L - ARGINYL - L - PROLINE METHYL ESTER 22.4 g. of Nα - carbobenzoxy - N(guanidino) - L - arginine and 32.5 g. of N(guanidino)-L-arginyl-proline methyl ester dihydrobromide are dissolved in 20 cc. of dimethylformamide and 150 cc. of acetonitrile, cooling is effected to −10°, 14 cc. of triethylamine and 11.3 g. of dicyclohexylcarbodiimide are added and shaking is effected for 3 days at 20°. Filtration is effected, the filtrate is evaporated, the residue is dissolved in a mixture of ethyl acetate and n-butanol (9:1), washing is effected with dilute sulfuric acid and aqueous sodium bicarbonate solution, drying is effected over sodium sulfate, concentration is effected and precipitation with ethyl ether. After reprecipitating twice, filtration and drying are effected and 22 g. of tripeptide ester are obtained. Melting point 115° (decomposition). $[\alpha]_D^{22} = -20°$ in dimethylformamide.

EXAMPLE 8.—Nα-CARBOBENZOXY - L - PHENYLALANYL - N(GUANIDINO) - p - NITROCARBOBENZOXY - L - ARGINYL - L - PROLINE 10 g. of Nα - carbobenzoxy - L - phenylalanyl-N(guanidino) - p - nitrocarbobenzoxy - L - arginyl - L - proline methyl ester are dissolved in 50 cc. of dioxane and 20 ml. of 1 N sodium hydroxide, the solution is left to stand for one hour at 20°, 500 cc. of water and 1 cc. of glacial acetic acid are added. The oily precipitate is extracted with chloroform, drying is effected over sodium sulfate, concentration is effected and precipitation with ethyl ether. After filtering and drying, 8.6 g. of tripeptide are obtained. Melting point 172°. $[\alpha]_D^{22} = -34°$ in 95% acetic acid.

EXAMPLE 9.—Nα - CARBOBENZOXY - N(GUANIDINO) - p - NITROCARBOBENZOXY - L - ARGINYL - N(GUANIDINO) - p - NITROCARBOBENZOXY - L - ARGINYL - L - PROLINE 8.4 g. of Nα - carbobenzoxy - N(guanidino) - p - nitrocarbobenzoxy - L - arginyl - N(guanidino) - p - nitrocarbobenzoxy - L - arginyl - L - proline methyl ester are dissolved in 50 cc. of dioxane, 20 cc. of 2 N sodium hydroxide are added, the mixture is left to stand for one hour at 20°, 500 cc. of water and 1 cc. of glacial acetic acid are added, extraction is effected with a mixture of chloroform/n-butanol (9:1), drying is effected over sodium sulfate, concentration is effected to 100 cc., precipitation is effected with ethyl ether, filtration and drying are effected. 8.0 g. of Nα - carbobenzoxy - N(guanidino) - p - nitrocarbobenzoxy - L - arginyl - N(guanidino) - p - nitrocarbobenzoxy - L - arginyl - L - proline are obtained. Melting point 168°. $[\alpha]_D^{22} = -27°$ in 95% acetic acid.

EXAMPLE 10.—L - ARGINYL - L - ARGINYL - L PROLINE 6. g. of the protected tripeptide obtained in Example 8 are dissolved in 100 cc. of 66% acetic acid and hydrogenation is effected in the presence of 1.0 g. of 10% palladium catalyst. After 12 hours, filtration is effected, evaporation is effected and the residue is crystallized from a mixture of ethanol/ethyl ether (1:1). 2.5 g. of L-arginyl - L - arginyl - L - proline are obtained. $[\alpha]_D^{22} = -38°$ in 6 N HCl.

EXAMPLE 11.—L - PHENYLALANYL-L-ARGINYL-L-PROLINE 6 g. of Nα - carbobenzoxy - L - phenylalanyl - N(guanidino) - p - nitrocarbobenzoxy - L - arginyl - L - proline are dissolved in 100 cc. of 66% acetic acid and hydrogenation is effected at normal pressure in the presence of 1 g. of 10% palladium catalyst. After 12 hours, filtration is effected, evaporation is effected and the residue is crystallized from a mixture of ethanol/ethyl ether (1:1). 2.9 g. of L - phenylalanyl - L - arginyl - L - proline are obtained. $[\alpha]_D^{22} = -22°$ in 6 N HCl.

What is claimed is:

1. In a process for the manufacture of peptides built up from α-amino acids by condensing in a series of standard peptide condensation reactions, members selected from the group consisting of α-amino acids, peptides built up from α-amino acids, and derivatives thereof, and wherein at least one component of said α-amino acids is arginine and the guanidino radical of said arginine and at least one of the α-amino or carboxyl groups of said α-amino acids are protected during said peptide condensation reactions, the improvement which comprises protecting said guanidino radical with the p-nitrobenzyloxycarbonyl group and at least one of the α-amino or carboxyl groups of said α-amino acids with a protective group removable in the case of the α-amino protecting group by treatment with acid, and in the case of the carboxyl protecting group by treatment with acid or aqueous alkali, then selectively removing at least one of said α-amino or carboxyl protecting groups by treatment with acid in the case of removal of the α-amino protecting group or acid or aqueous alkali in the case of removal of the carboxyl protecting group, and thereafter removing the guanidino protecting group by hydrogenolysis.

2. In a process for the manufacture of peptides built up from α-amino acids by condensing in a series of standard peptide condensation reactions, members selected from the group consisting of α-amino acids, peptides built up from α-amino acids, and derivatives thereof, and wherein at least one component of said α-amino acids is arginine and the guanidino radical of said arginine and at least one of the α-amino or carboxyl groups of said α-amino acids are protected during said peptide condensation reactions, the improvement which comprises protecting said guanidino radical with the p-nitrobenzyloxycarbonyl group and at least one of the α-amino or carboxyl groups of said α-amino acids with a protective group removable in the case of the α-amino protecting group by treatment with hydrogen bromide in glacial acetic acid, trifluoroacetic acid or aqueous acetic acid, and in the case of the carboxyl protecting group by treatment with trifluoroacetic acid or aqueous alkali, then selectively removing at least one of said α-amino or carboxyl protecting groups by treatment with hydrogen bromide in glacial acetic acid, trifluoroacetic acid or aqueous acetic acid in the case of removal of the α-amino protecting group or trifluoroacetic acid or aqueous alkali in the case of removal of the carboxyl protecting group, and thereafter removing the guanidino protecting group by hydrogenolysis.

References Cited

UNITED STATES PATENTS 3,247,178   4/1966   Schwyzer et al. ____ 260—112.5

OTHER REFERENCES

Gish et al., J. Am. Chem. Soc. 75, 5872–5877 (1953).
Guttmann et al., Chimia (Aarau) 18, 185 (1964).
Li et al., J. Am. Chem. Soc. 82, 5760–5762 (1960).

LEWIS GOTTS, *Primary Examiner.*

ELBERT L. ROBERTS, *Examiner.*

M. M. KASSENOFF, *Assistant Examiner.*